US012753579B2

(12) United States Patent
Cotterman

(10) Patent No.: US 12,753,579 B2
(45) Date of Patent: Oct. 6, 2026

(54) SYSTEM FOR RETURNING FLUID FROM HYDRAULIC DEVICES OF WORK MACHINES

(71) Applicant: Caterpillar Inc., Peoria, IL (US)

(72) Inventor: Craig Nicholas Cotterman, Fairborn, OH (US)

(73) Assignee: Caterpillar Inc., Peoria, IL (US)

( * ) Notice: Subject to any disclaimer, the term of this patent is extended or adjusted under 35 U.S.C. 154(b) by 508 days.

(21) Appl. No.: 18/449,797

(22) Filed: Aug. 15, 2023

(65) Prior Publication Data

US 2025/0059731 A1 Feb. 20, 2025

(51) Int. Cl.

| | |
|---|---|
| ***E02F 9/22*** | (2006.01) |
| ***E02F 9/08*** | (2006.01) |
| ***F15B 1/26*** | (2006.01) |
| ***F15B 21/00*** | (2006.01) |

(52) U.S. Cl.

CPC .......... *E02F 9/2278* (2013.01); *E02F 9/0883* (2013.01); *F15B 1/26* (2013.01); *F15B 21/005* (2013.01)

(58) Field of Classification Search

CPC ......... E02F 9/2278; E02F 9/0883; F15B 1/26; F15B 21/005

See application file for complete search history.

(56) References Cited

U.S. PATENT DOCUMENTS

| | | | |
|---|---|---|---|
| 7,647,983 B2 | 1/2010 | Gharsalli | |
| 2015/0376863 A1 | 12/2015 | Ziegenmeyer et al. | |
| 2017/0082121 A1 | 3/2017 | Kolonsky | |
| 2022/0178457 A1* | 6/2022 | O'Neill ................ | F15B 21/044 |

* cited by examiner

*Primary Examiner* — P. Macade Nichols

(57) ABSTRACT

A system, for returning fluid from one or more hydraulic devices to a fluid tank of a work machine, includes a manifold and a mount. The manifold is configured to be fixedly mounted to the fluid tank. The manifold defines an inner volume for receiving a flow of the fluid returning from the one or more hydraulic devices. The mount is configured to be fixedly mounted to each of the fluid tank and the manifold. The mount defines one or more passageways configured to establish a fluid connection between the inner volume of the manifold, a filter of the work machine, and an internal volume of the fluid tank.

20 Claims, 7 Drawing Sheets

SYSTEM FOR RETURNING FLUID FROM HYDRAULIC DEVICES OF WORK MACHINES

TECHNICAL FIELD

The present disclosure relates to work machines, such as motor graders, provided with hydraulic devices, such as hydraulic actuators. More particularly, the present disclosure relates to a system for returning hydraulic fluid from one or more hydraulic devices to a fluid tank of a work machine.

BACKGROUND

Work machines, such as a motor grader, commonly utilize fluids to accomplish various tasks. As an example, a fluid may correspond to hydraulic oil stored in a fluid tank of the motor grader. In an exemplary operation, the hydraulic oil (from the fluid tank) is supplied to hydraulic devices (e.g., hydraulic cylinders) of the motor grader and discharged from the hydraulic devices back into the fluid tank to drive the hydraulic devices, for example, to adjust a position of an implement (e.g., a blade) of the motor grader.

Fluid return systems are provided for receiving the fluid discharged from the hydraulic devices and directing the received fluid back to the fluid tank. Conventional fluid return systems may include a plurality of components that are complex in construction, expensive to manufacture, and provide potential leak points, for example, at joints (or connections) between the components.

SUMMARY OF THE INVENTION

In one aspect, the disclosure relates to a system for returning fluid from one or more hydraulic devices to a fluid tank of a work machine. The system includes a manifold and a mount. The manifold is configured to be fixedly mounted to the fluid tank. The manifold defines an inner volume for receiving a flow of the fluid returning from the one or more hydraulic devices. The mount is configured to be fixedly mounted to each of the fluid tank and the manifold. The mount defines one or more passageways. The one or more passageways are configured to establish a fluid connection between the inner volume of the manifold, a filter of the work machine, and an internal volume of the fluid tank.

In another aspect, the disclosure is directed to a work machine. The work machine includes a fluid tank defining an internal volume and a system for returning a fluid from one or more hydraulic devices, of the work machine, to the fluid tank. The system includes a manifold and a mount. The manifold is configured to be fixedly mounted to the fluid tank. The manifold defines an inner volume for receiving a flow of the fluid returning from the one or more hydraulic devices. The mount is configured to be fixedly mounted to each of the fluid tank and the manifold. The mount defines one or more passageways. The one or more passageways are configured to establish a fluid connection between the inner volume of the manifold, a fluid filter of the work machine, and an internal volume of the fluid tank.

In yet another aspect, the disclosure relates to a method of assembling a system for returning fluid from one or more hydraulic devices to a fluid tank of a work machine. The method includes fixedly mounting a manifold to the fluid tank. The manifold defines an inner volume for receiving a flow of the fluid returning from the one or more hydraulic devices. Further, the method includes fixedly mounting a mount to the fluid tank and the manifold. The mount defines one or more passageways. The one or more passageways are configured to establish a fluid connection between the inner volume of the manifold, a fluid filter of the work machine, and an internal volume of the fluid tank.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
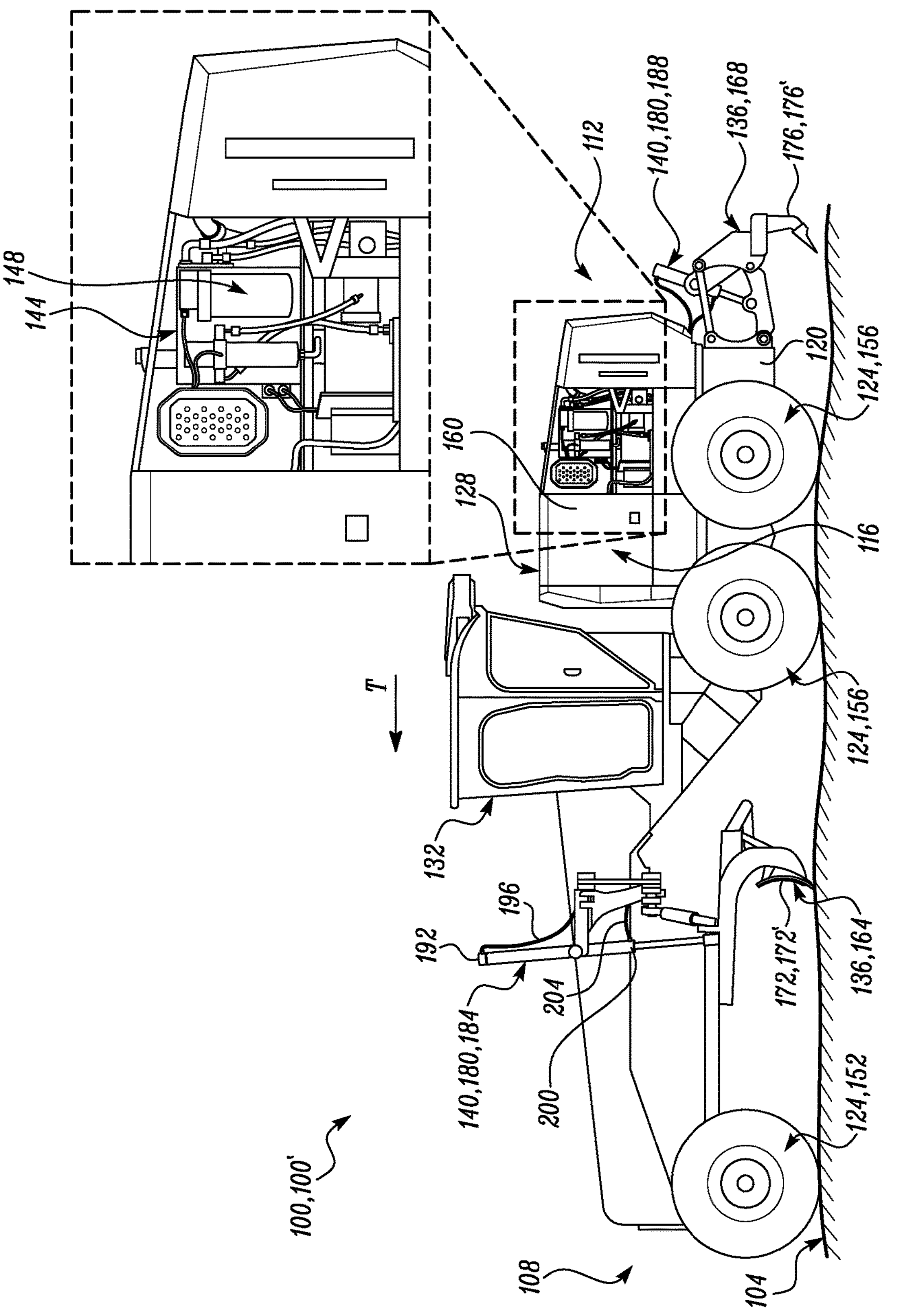
FIG. 1 illustrates an exemplary work machine provided with hydraulic devices, in accordance with an embodiment of the present disclosure.

Referring to FIG. 1, an exemplary work machine 100 (hereinafter referred to as "machine 100") is shown. The machine 100 may perform various operations associated with an industry such as construction, mining, farming, transportation, or any other industry known in the art. As an example, the machine 100 is embodied as motor grader 100' configured to perform functions, such as earth altering functions, including displacing, spreading, distributing, leveling, and grading materials, such as soil, over a ground surface or a work surface 104. Alternatively, the machine 100 may be any work machine including, but not limited to, a backhoe loader, an excavator, a haul truck, a dozer, a track type tractor, a forklift, a skid steer loader, a multi-terrain loader, and the like.

The machine 100 may include a forward end 108 and a rearward end 112 opposite to the forward end 108. It should be noted that the forward end 108 and the rearward end 112 may be defined in relation to an exemplary direction of travel (indicated by an arrow 'T', in FIG. 1) of the machine 100, with said direction of travel 'T' being defined from the rearward end 112 towards the forward end 108. Also, the machine 100 may include two lateral sides 116 located transversely relative to the exemplary direction of travel 'T' of the machine 100. It should be noted that only one lateral side 116, e.g., a left side 116, is visible in FIG. 1.

The machine 100 may include a frame 120, ground-engaging members 124, a power system 128, an operator cabin 132, and one or more work implements 136. Also, the machine 100 includes one or more hydraulic devices 140, a fluid tank 144, and a fluid filter 148. The frame 120 may accommodate and/or support the power system 128, the operator cabin 132, and the work implements 136, although other known components may be supported by the frame 120, as well. The ground-engaging members 124 may support and propel the frame 120 (or the machine 100) on the work surface 104. The ground-engaging members 124 may include a set of front wheels 152 disposed towards the forward end 108 of the machine 100 and a set of rear wheels 156 disposed towards the rearward end 112 of the machine 100. In some embodiments, the ground-engaging members 124 may include crawler tracks (not shown) provided either alone or in combination with the wheels 152, 156.

The power system 128 includes a power compartment 160 of the machine 100 and a power source (not shown) housed within the power compartment 160. The power source may include a combustion engine, such as a diesel engine, a gasoline engine, a gaseous fuel powered engine (e.g., a natural gas engine), or any other type of combustion engine known in the art. The power source may alternatively include a non-combustion source of power, such as a fuel cell, or a power storage device, such as a battery unit. The power source may be configured to generate an output power required to operate various systems or assemblies on the machine 100, such as the ground-engaging members 124, the work implements 136, and the like.

The operator cabin 132 may facilitate stationing of one or more operators therein, to monitor the operations of the machine 100. Also, the operator cabin 132 may house various components and controls of the machine 100, access to one or more of which may help the operators to control the machine's movement and/or operation. For example, the various components and controls of the machine 100 may include one or more steering wheels, touch screens, display devices, joysticks, switches etc., to facilitate an operator in operating the work implements 136, or the hydraulic devices 140, and the like, of the machine 100.

Two work implements 136, namely—a front work implement 164 and a rear work implement 168, are provided on the machine 100. The front work implement 164 may be mounted towards the forward end 108 of the machine 100. The front work implement 164 may include a blade 172 (e.g., a moldboard 172'). The blade 172 may be supported under the frame 120 of the machine 100. The rear work implement 168 may be coupled to and supported on the frame 120 and may be located towards the rearward end 112 of the machine 100. The rear work implement 168 may include a ripper set 176 including one or more ripper blades 176'. The front work implement 164 and the rear work implement 168 may perform one or more of the aforesaid earth altering functions. Details related to each of the front work implement 164 and the rear work implement 168 may be contemplated by those skilled in the art and shall not be further discussed.

The hydraulic devices 140 may include one or more hydraulic cylinders 180 configured to be hydraulically actuated to control position and/or orientation of the work implements 136. For example, two first hydraulic cylinders 184 (one of which is visible in FIG. 1) are hydraulically actuated (e.g., to extend or to retract) to control a position of the front work implement 164 with respect to the work surface 104, and a second hydraulic cylinder 188 is hydraulically actuated (e.g., to extend or to retract) to control a position of the rear work implement 168 with respect to the work surface 104. In some embodiments, it may be contemplated that the hydraulic devices 140 may also include other types of hydraulic systems, assemblies, and/or components of the machine 100, such as hydraulic motors, hydraulic pumps, and the like.

The hydraulic devices 140 may be hydraulically actuated upon application (e.g., supply and discharge) of fluid (e.g., hydraulic oil) under pressure. For instance, the first hydraulic cylinder 184 may be extended by supplying fluid to a head end 192 thereof (via a first fluid line 196) and discharging the fluid from a rod end 200 thereof (via a second fluid line 204), for example, to lower the blade 172 with respect to the work surface 104. Alternatively, the first hydraulic cylinder 184 may be retracted by supplying the fluid to the rod end 200 thereof (via the second fluid line 204) and discharging the fluid from the head end 192 thereof (via the first fluid line 196), for example, to raise the blade 172 with respect to the work surface 104.

The fluid tank 144 is configured to store the fluid to be supplied to and discharged from the hydraulic devices 140. The fluid tank 144 may isolate and/or protect the fluid stored therein from outside environmental factors, such as moisture, dust, dirt, and the like. In the present embodiment, the fluid tank 144 is accommodated within the power compartment 160 (as shown in FIG. 1). In other embodiments, the fluid tank 144 may be accommodated at any suitable location of the machine 100.

Figure 2:
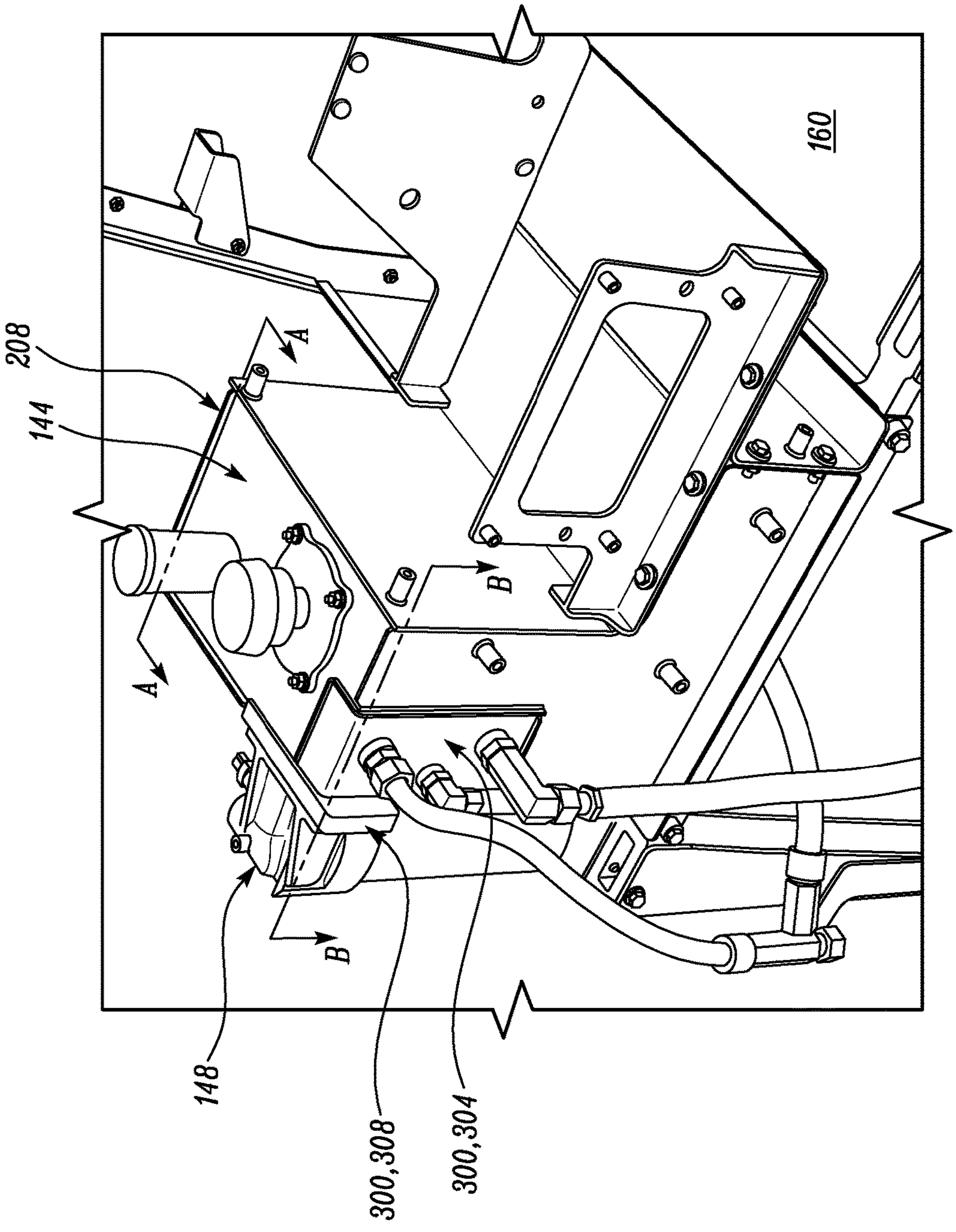
FIG. 2 illustrates a perspective view of a system for returning fluid from the hydraulic devices to a fluid tank of the work machine, in accordance with an embodiment of the present disclosure.
Figure 3:
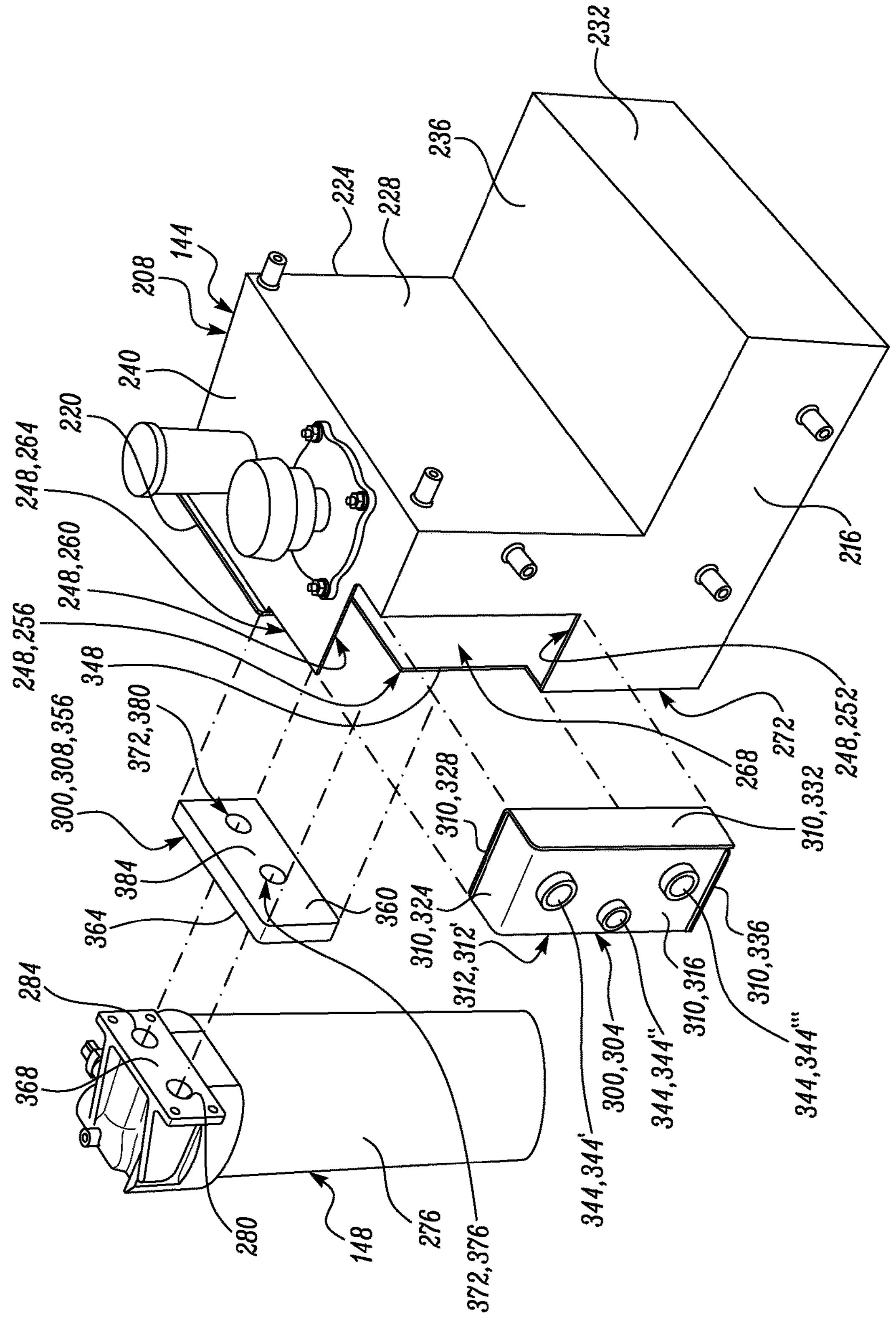
FIG. 3 illustrates an exploded view of the system, in accordance with an embodiment of the present disclosure.
Figure 5:
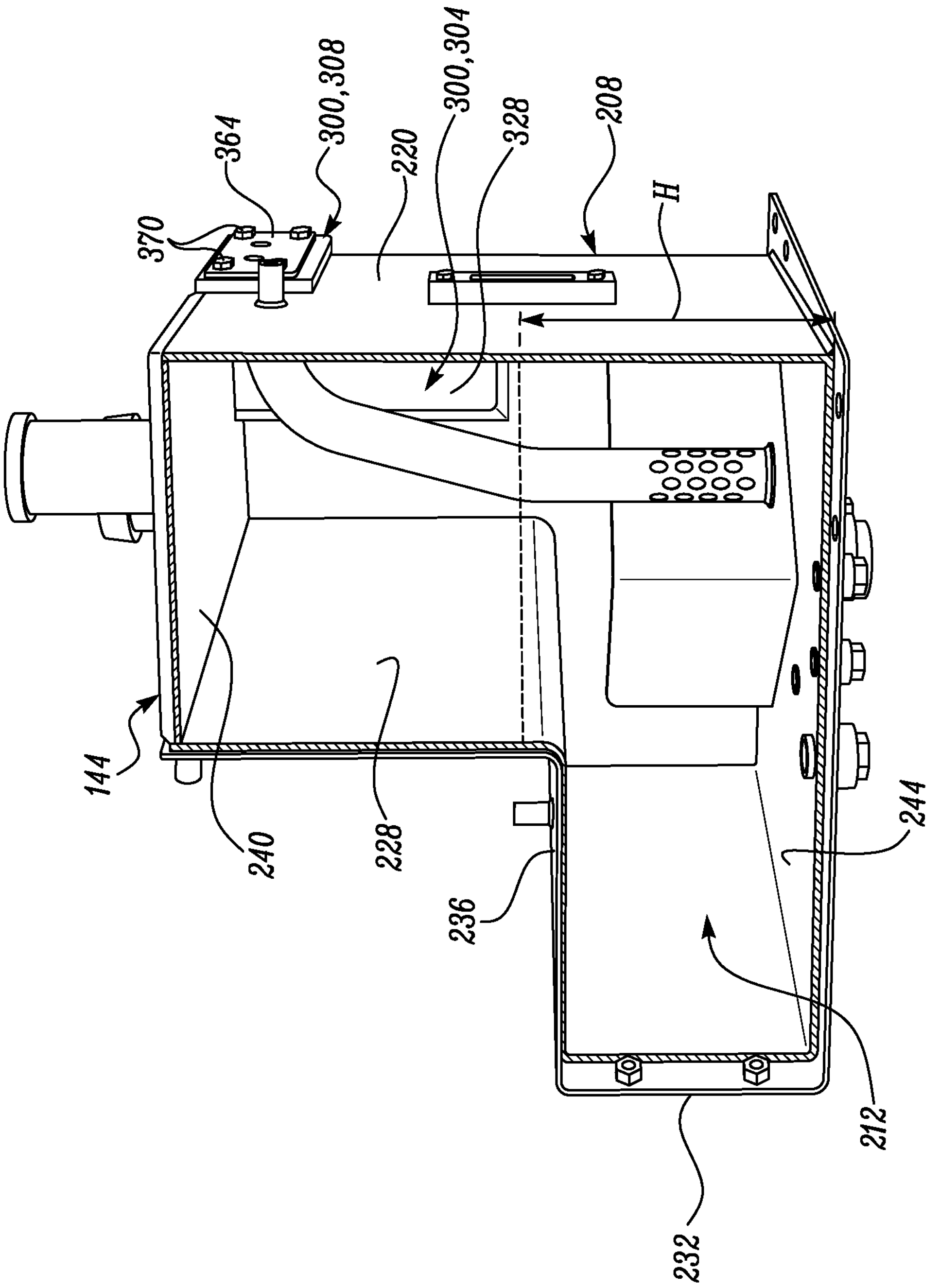
FIG. 5 illustrates a cross-sectional view of the system, taken along lines A-A of FIG. 2, in accordance with an embodiment of the present disclosure.

Referring to FIGS. 2, 3, and 5, the fluid tank 144 includes a casing 208 that defines an internal volume 212 and walls, namely—a first wall 216, a second wall 220, a third wall 224, a fourth wall 228, a fifth wall 232, a sixth wall 236, a seventh wall 240 (or top wall 240), and an eighth wall 244 (or bottom wall 244). The sixth wall 236, the seventh wall 240, and the eighth wall 244 may be substantially parallel to and spaced apart from one another. The first wall 216, the second wall 220, the third wall 224, the fourth wall 228, and the fifth wall 232 may be at an angle, for example, substantially perpendicular, with respect to the seventh wall 240. The first wall 216 and the third wall 224 may be substantially parallel to each other. The second wall 220 may extend at an angle from the first wall 216 to meet the third wall 224. Further, the fourth wall 228 and the fifth wall 232 may be substantially parallel to the second wall 220. As shown in FIG. 3, the first wall 216, the second wall 220, the third wall 224, the fourth wall 228, the fifth wall 232, the sixth wall 236, the seventh wall 240, and the eighth wall 244 may be coupled (e.g., welded) together to surround the internal volume 212 of the fluid tank 144.

Further, the fluid tank 144 is provided with apertures 248 (as shown in FIG. 3). The apertures 248 are defined on at least one of the walls of the fluid tank 144. In an exemplary embodiment, as shown in FIG. 3, the fluid tank 144 include four apertures, namely, a first aperture 252, a second aperture 256, a third aperture 260, and a fourth aperture 264. The first aperture 252 may be defined at the first wall 216. The second aperture 256 may be defined at the second wall 220. The third aperture 260 and the fourth aperture 264 may be defined at the seventh wall 240 (or the top wall 240).

The apertures 248 are configured to receive at least one of manifold or mount for fixedly mounting the at least one of the manifold or the mount to the fluid tank 144 (discussed later). In the present embodiment, as shown in FIG. 3, the first aperture 252, the second aperture 256, the third aperture 260, and the fourth aperture 264 are connected together to form a receptacle portion 268 at a corner 272 of the casing 208 (of the fluid tank 144) at which the first wall 216, the second wall 220, and the seventh wall 240 meet together. In the present embodiment, the receptacle portion 268 is formed at a position above a maximum fill level 'H' of the fluid in the internal volume 212 of the fluid tank 144. It may be contemplated that, in other embodiments, a higher or a lower number of apertures 248 may be defined at any suitable location of the fluid tank 144.

The fluid filter 148 is now discussed. The fluid filter 148 may be disposed upstream of the fluid tank 144 with respect to the flow of the fluid. The fluid filter 148 may be configured to remove contaminants (e.g., dirt, debris, etc.) from the fluid (drained out from the hydraulic devices 140) before the fluid is returned to the fluid tank 144. In an exemplary embodiment, as shown in FIG. 3, the fluid filter 148 may include a housing 276, a fluid inlet 280 and a fluid outlet 284 defined at the housing 276, and one or more filter elements (not shown) accommodated within the housing 276. The fluid inlet 280, the filter elements (not shown), and the fluid outlet 284 are fluidly connected to each other. In an exemplary operation, the fluid to be filtered enters the fluid filter 148 from the fluid inlet 280, passes through the filter elements to get filtered, and then exits the fluid filter 148 via the fluid outlet 284.

During an operation of the machine 100, the fluid (stored within the fluid tank 144) is supplied to the hydraulic devices 140 and is returned from the hydraulic devices 140 back to the fluid tank 144. For instance, to hydraulically actuate the first hydraulic cylinder 184 to correspondingly raise or lower the blade 172', the fluid from the fluid tank 144 is supplied to one chamber of the first hydraulic cylinder 184, for example, via one of the first fluid line 196 and the second fluid line 204. At the same time, the fluid present in the other chamber of the first hydraulic cylinder 184 is drained out from the first hydraulic cylinder 184, for example, via the other of the first fluid line 196 and the second fluid line 204.

To return the fluid drained out from the hydraulic devices 140 (e.g., the first hydraulic cylinder 184) back to the fluid tank 144, in one or more aspects of the present disclosure, a system 300 is provided on the machine 100. The system 300 receives the fluid drained out from the hydraulic devices 140, for example, from one of the first fluid line 196 and the second fluid line 204 of the first hydraulic cylinder 184, and routes the fluid back into the fluid tank 144. The system 300 includes a manifold 304 and a mount 308, details pertaining to each of which will now be discussed.

Referring to FIGS. 3-6, the manifold 304 includes a hollow casing 312. By way of non-limiting example, the hollow casing 312 may be embodied as a substantially cuboid shaped structure 312' that defines a plurality of wall portions 310, namely—a first wall portion 316, a second wall portion 320 (see FIG. 4), a third wall portion 324, a fourth wall portion 328, a fifth wall portion 332, and a sixth wall portion 336. The first wall portion 316 and the fourth wall portion 328 may be substantially parallel to one another. The second wall portion 320 may extend at an angle from the first wall portion 316, for example, substantially perpendicular to the first wall portion 316. The third wall portion 324 may extend from the first wall portion 316, for example, in a direction substantially perpendicular to each of the first wall portion 316 and the second wall portion 320. The fifth wall portion 332 may extend from the fourth wall portion 328, for example, in a direction substantially parallel to the second wall portion 320. The sixth wall portion may extend from the fourth wall portion 328, for example, in a direction substantially parallel to the third wall portion 324.

Figure 4:
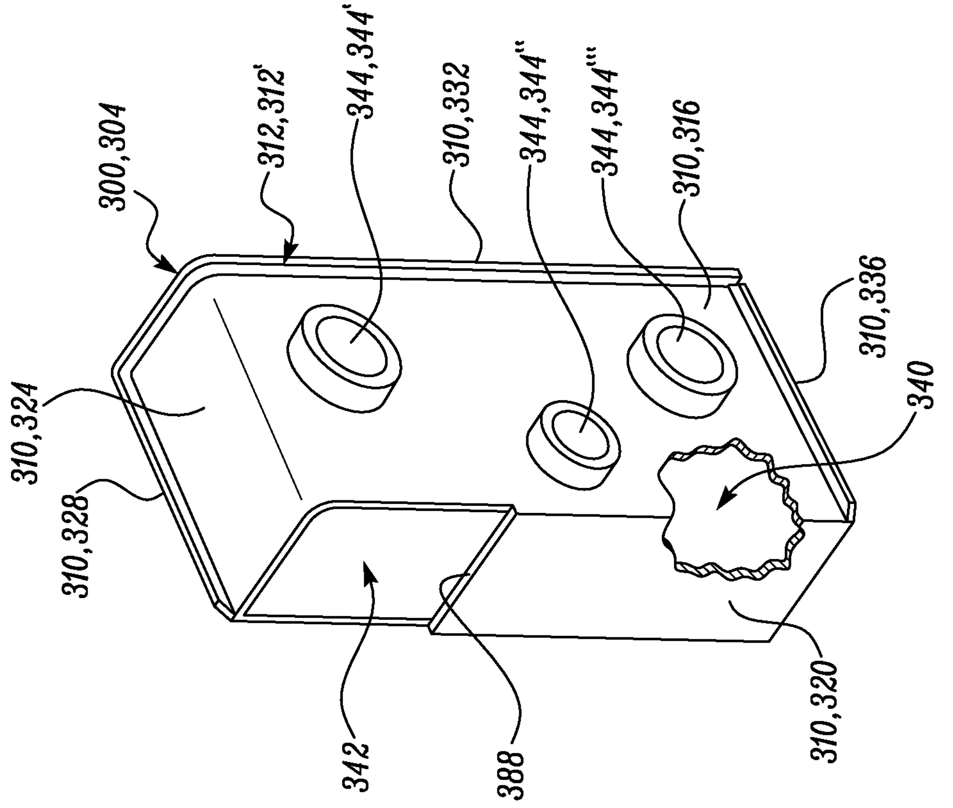
FIG. 4 illustrates the system, in accordance with an embodiment of the present disclosure.

The first wall portion 316, the second wall portion 320, the third wall portion 324, the fourth wall portion 328, the fifth wall portion 332, and the sixth wall portion 336 may be coupled (e.g., welded) together to define and surround an inner volume 340 of the manifold 304. In the present embodiment, as shown in FIG. 4, the manifold 304 also defines a window 342 at the second wall portion 320 to facilitate a fluid communication between the inner volume 340 of the manifold 304 and an external environment and/or components (e.g., the fluid filter 148 and the mount 308, discussed later). In the present embodiment, the inner volume 340 of the manifold 304 is less than the internal volume 212 of the fluid tank 144.

The inner volume 340 is configured to receive a flow of the fluid returning from the hydraulic devices 140. To receive the flow of the fluid returning from the hydraulic devices 140, at least one inlet port 344 is defined on at least one wall portion 310 of the manifold 304. The at least one port 344 fluidly connects the inner volume 340 of the manifold 304 with the plurality of fluid lines, such as the first fluid line 196, or the second fluid line 204, carrying the fluid drained out from the hydraulic devices 140. In an exemplary embodiment, as shown in FIG. 4, three inlet ports 344, namely—a first inlet port 344', a second inlet port 344'', and a third inlet port 344''', are defined at the first wall portion 316 of the manifold 304. In some embodiments, the three inlet ports 344 may be disposed on the same side of the manifold 304. It may be contemplated that, in other embodiments, a higher or a lower number of said inlet ports 344 may be defined at any suitable wall portion 310 and/or side of the manifold 304 based on the application requirements.

Figure 6:
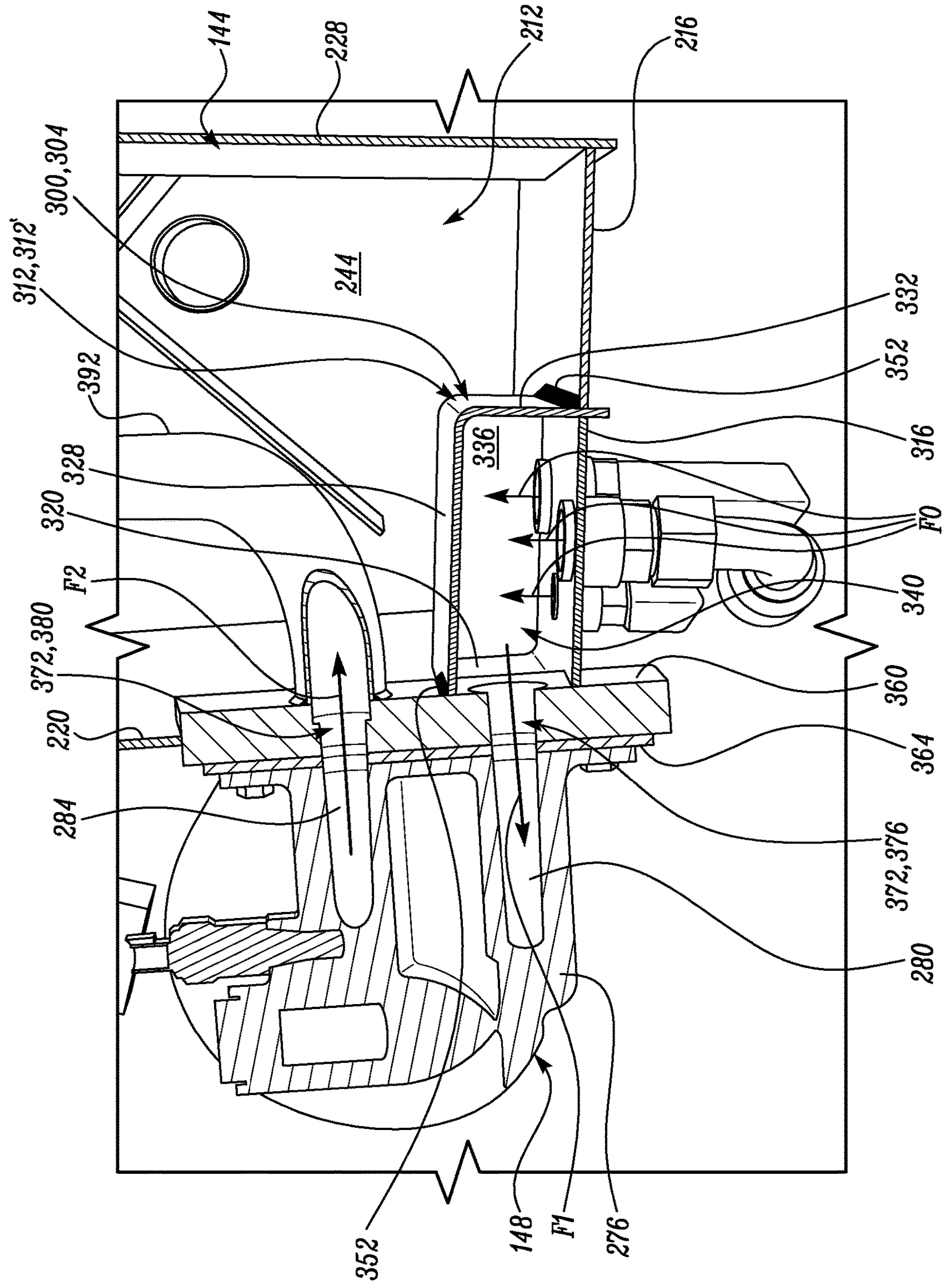
FIG. 6 illustrates a cross-sectional view of the system, taken along lines B-B of FIG. 2, in accordance with an embodiment of the present disclosure.

The manifold 304 is configured to be fixedly mounted to the fluid tank 144. The manifold 304 may be fixedly mounted to the fluid tank 144 such that the manifold 304 may lie flush with (or recessed relative to) at least one wall of the fluid tank 144. In the present embodiment, as shown in FIGS. 3-6, the manifold 304 is received within the receptacle portion 268 (defined by the first, second, third, and fourth apertures 252, 256, 260, 264, connected together at the corner 272) of the fluid tank 144. Once received within the receptacle portion 268, the manifold 304 is fixedly coupled to edges 348 of the receptacle portion 268, for example, via a welded connection 352 (as shown in FIG. 6). When mounted in this configuration, the manifold 304 is located above the maximum fill level 'H' of the fluid in the internal volume 212 of the fluid tank 144 (as shown in FIG. 5).

The mount 308 is embodied as a flat plate 356. The flat plate 356 (or the mount 308) defines a first end surface 360 and a second end surface 364 (please see FIG. 5) opposite to the first end surface 360. The first end surface 360 facilitates mounting of the mount 308 to the fluid tank 144. The second end surface 364 is configured to attach the fluid filter 148 to the mount 308. In an exemplary coupling of the fluid filter 148 to the mount 308, as shown in FIGS. 3 and 6, a filter mounting plate 368 defined at the housing 276 of the fluid filter 148 is abutted against the second end surface 364 of the mount 308 and is fastened to the second end surface 364, for example, via fasteners 370 (please see FIG. 5).

The mount 308 defines passageways 372 configured to establish a fluid connection between the inner volume 340 of the manifold 304, the fluid filter 148, and the internal volume 212 of the fluid tank 144. In the present embodiment, as shown in FIGS. 3 and 6, the mount 308 defines two passageways 372, namely—a first passageway 376 and a second passageway 380. Each of the first passageway 376 and the second passageway 380 extend from the first end surface 360 to the second end surface 364. The first passageway 376 and the second passageway 380 may be coaxially aligned with the fluid inlet 280 and the fluid outlet 284, respectively, of the fluid filter 148 when the fluid filter 148 is attached to the second end surface 364 of the mount 308.

The mount 308 is configured to be fixedly mounted to each of the fluid tank 144 and the manifold 304. When mounted to each of the fluid tank 144 and the manifold 304, the first end surface 360 along with the wall portions 310 of the manifold 304 surrounds the inner volume 340 of the manifold 304. Further, in this configuration, the first passageway 376 establishes a fluidly sealed connection between the inner volume 340 of the manifold 304 and fluid inlet 280 of the fluid filter 148 to route the fluid therebetween. In an example, as shown in FIG. 6, the first passageway 376 routes the fluid from the inner volume 340 (of the manifold 304) to the fluid inlet 280 of the fluid filter 148 (as illustrated via a flowline 'F1', in FIG. 6). Furthermore, the second passageway 380 376 establishes a fluidly sealed connection between the fluid outlet 284 of the fluid filter 148 and the internal volume 212 of the fluid tank 144 to route the fluid therebetween. In an example, as shown in FIG. 6, the second passageway 380 routes the fluid from the fluid outlet 284 of the fluid filter 148 to an inlet conduit 392 (see FIG. 6) of the fluid tank 144 that opens into the internal volume 212 of fluid tank 144 (as illustrated via a flowline 'F2', in FIG. 6).

INDUSTRIAL APPLICABILITY

Figure 7:
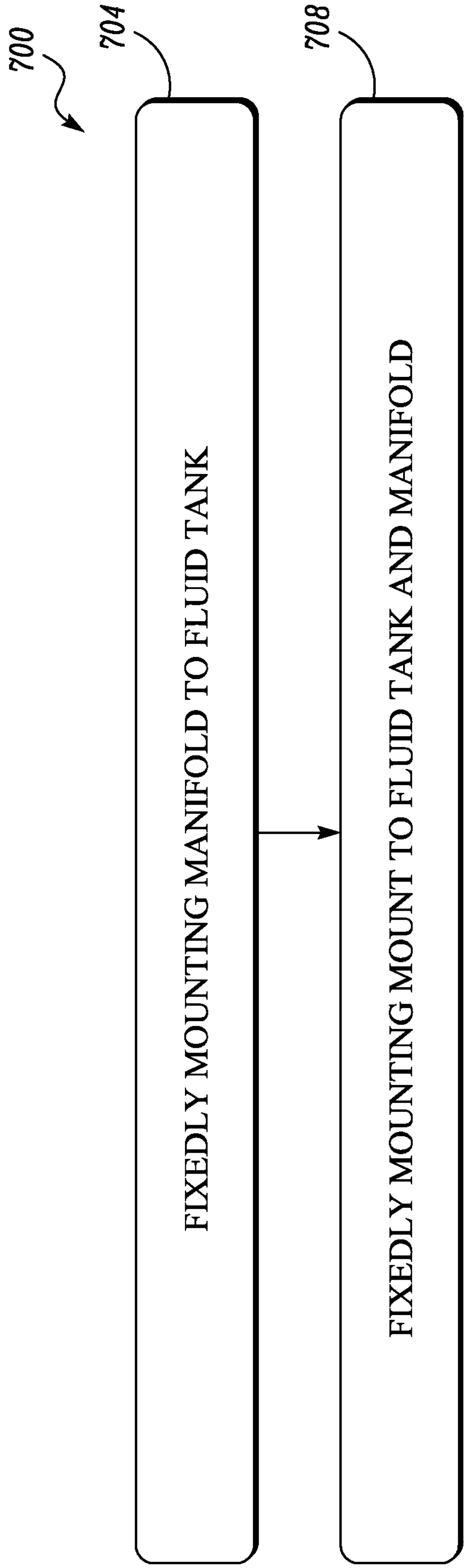
FIG. 7 illustrates a flowchart illustrating a method of assembling the system, in accordance with an embodiment of the present disclosure.

Referring to FIG. 7, an exemplary method of assembling the system 300 for returning the fluid from the hydraulic devices 140 to the fluid tank 144, is discussed. The method is discussed by way of a flowchart 700 that illustrates exemplary steps (i.e., from 704 to 708) associated with the method. The method is also discussed in conjunction with FIGS. 1-6.

The method begins with fixedly mounting the manifold 304 to the fluid tank 144, at 704. The manifold 304 is at least partially positioned within the receptacle portion 268 of the fluid tank 144. In an exemplary method of positioning the manifold 304 within the receptacle portion 268, the manifold 304 is positioned into the first aperture 252 and is moved in a direction towards the internal volume 212 of the fluid tank 144 such that the wall portions 310 of the manifold 304 are mated (e.g., abutted) to the corresponding edges 348 of the receptacle portion 268. Once positioned within the receptacle portion 268, the wall portions 310 of the manifold 304 are fixedly coupled to their corresponding edges 348 of the receptacle portion 268, for example, via the welded connection 352 (as shown in FIG. 6). When mounted in this configuration, the manifold 304 is located above the maximum fill level 'H' of the fluid in the internal volume 212 of the fluid tank 144.

Further, at 708, the mount 308 is fixedly mounted to each of the fluid tank 144 and the manifold 304. For that, the mount 308 is at least partially positioned within the receptacle portion 268 of the fluid tank 144. In an exemplary method of positioning the mount 308 within the receptacle portion 268, the mount 308 is positioned into the second aperture 256 and is moved into the fourth aperture 264 in a manner such that the first end surface 360 (of the mount 308) is mated (e.g., abutted) to the corresponding edges 348 of the receptacle portion 268. In such a mounting configuration, a portion (of the first end surface 360) surrounding the first passageway 376 covers the window 342 defined at the second wall portion 320 of the manifold 304. Further, in said mounting configuration, the fourth wall portion 328 of the manifold 304 is abutted against the first end surface 360 at an intermediate region 384 located between the first passageway 376 and the second passageway 380. Next, the mount 308 is fixedly coupled (e.g., via a welded connection, not shown) to the corresponding edges 348 of the receptacle portion 268 and to a portion 388 (shown in FIG. 4) of the second wall portion 320 surrounding the window 342 of the manifold 304.

Once the manifold 304 and the mount 308 are fixedly mounted to the fluid tank 144, the fluid filter 148 may be attached to the second end surface 364 of the mount 308, for example, via the fasteners 370. In such configuration, the first passageway 376 fluidly connects the inner volume 340 of the manifold 304 with fluid inlet 280 of the fluid filter 148, and the second passageway 380 fluidly connects the fluid outlet 284 of the fluid filter 148 with the internal volume 212 of the fluid tank 144.

In operation, the fluid returning from the hydraulic devices 140 is received within the inner volume 340 of the manifold 304, for example, via the inlet ports 344 fluidly connected with the fluid lines (e.g., the first fluid line 196, the second fluid line 204, etc.) (as illustrated via a flowlines 'F0', in FIG. 6). The fluid received within the inner volume 340 (of the manifold 304) is then routed through the mount 308, via the first passageway 376, to the fluid inlet 280 of the fluid filter 148 (as illustrated via the flowline 'F1'). The fluid entering the fluid filter 148 via the fluid inlet 280 is then passed through the filter elements (not shown) and is exited from the fluid filter 148 (as a filtered fluid, free from any contaminants) via the fluid outlet 284. The (filtered) fluid exiting the fluid outlet 284 (of the fluid filter 148) is then routed through the mount 308, via the second passageway 380, to the inlet conduit 392 and further into the internal volume 212 of the fluid tank 144 (as illustrated via the flowline 'F2', in FIG. 6).

The system 300 may be applicable to any work machine (e.g., the motor grader 100'), provided with hydraulic devices (such as the hydraulic devices 140) and fluid tanks (such as the fluid tank 144). The manifold 304 and the mount 308, of the system 300, are simple in construction and are devoid of any complex geometric features. Because of this, the manifold 304 and the mount 308 can be easily and quickly manufactured using simple and low-cost manufacturing processes. Further, utilizing the system 300 for returning the fluid from the hydraulic devices 140 to the fluid tank 144 may eliminate multiple conduits (of different shapes and configurations) used conventionally for fluidly connecting the manifolds, the fluid filters, and the fluid tanks. This may reduce and/or eliminate potential leak points between the manifolds, the fluid filters, and the fluid tanks.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C;

A and B; A and C; B and C; A, B, and C; or multiple of any item such as A and A; B, B, and C; A, A, B, C, and C; etc.

It will be apparent to those skilled in the art that various modifications and variations can be made to the system, the work machine, and/or the method of the present disclosure without departing from the scope of the disclosure. Other embodiments will be apparent to those skilled in the art from consideration of the specification and practice of the system, the work machine, and/or the method disclosed herein. It is intended that the specification and examples be considered as exemplary only, with a true scope of the disclosure being indicated by the following claims and their equivalent.

What is claimed is:

1. A system for returning fluid from one or more hydraulic devices to a fluid tank of a work machine, the system comprising:

a manifold, configured to be fixedly mounted in a receptacle portion of the fluid tank, defining an inner volume for receiving a flow of the fluid returning from the one or more hydraulic devices; and a mount configured to be fixedly mounted to each of the fluid tank and the manifold, the mount defining one or more passageways configured to establish a fluid connection between the inner volume of the manifold, a fluid filter of the work machine, and an internal volume of the fluid tank.

2. The system of claim 1, wherein the mount defines a first end surface and a second end surface defined opposite to the first end surface and configured to attach the fluid filter to the mount, the one or more passageways including:

a first passageway extending from the first end surface to the second end surface and configured to route the fluid from the inner volume of the manifold to a fluid inlet of the fluid filter; and a second passageway extending from the first end surface to the second end surface and configured to route the fluid from a fluid outlet of the fluid filter to the internal volume of the fluid tank.

3. The system of claim 2, wherein the manifold includes a hollow casing defining a plurality of wall portions, and wherein the first end surface and the plurality of wall portions surrounds the inner volume of the manifold.

4. The system of claim 1, wherein the fluid tank defines a plurality of walls surrounding the internal volume of the fluid tank, and the fluid tank includes one or more apertures defined on at least one wall of the plurality of walls, the one or more apertures being configured to receive at least one of the manifold or the mount for fixedly mounting the at least one of the manifold or the mount to the fluid tank.

5. The system of claim 4, wherein the plurality of walls includes a first wall and a second wall extending at an angle from the first wall, the one or more apertures including:

a first aperture defined at the first wall and configured to receive the manifold; and a second aperture defined at the second wall and configured to receive the mount, wherein the first aperture and the second aperture are connected to each other to define the receptacle portion on the fluid tank.

6. The system of claim 1, wherein the manifold is mounted to the fluid tank at a position above a maximum fill level of the fluid in the internal volume of the fluid tank.

7. The system of claim 1, wherein the manifold is fixedly mounted to the fluid tank using a welded connection.

8. A work machine, comprising:

a fluid tank defining an internal volume; and a system for returning a fluid from one or more hydraulic devices, of the work machine, to the fluid tank, the system including:

a manifold, configured to be fixedly mounted in a receptacle portion of the fluid tank, defining an inner volume for receiving a flow of the fluid returning from the one or more hydraulic devices; and a mount configured to be fixedly mounted to each of the fluid tank and the manifold, the mount defining one or more passageways configured to establish a fluid connection between the inner volume of the manifold, a fluid filter of the work machine, and the internal volume of the fluid tank.

9. The work machine of claim 8, wherein the mount defines a first end surface and a second end surface defined opposite to the first end surface and configured to attach the fluid filter to the mount, the one or more passageways including:

a first passageway extending from the first end surface to the second end surface and configured to route the fluid from the inner volume of the manifold to a fluid inlet of the fluid filter; and a second passageway extending from the first end surface to the second end surface and configured to route the fluid from a fluid outlet of the fluid filter to the internal volume of the fluid tank.

10. The work machine of claim 9, wherein the manifold includes a hollow casing defining a plurality of wall portions, and wherein the first end surface and the plurality of wall portions surrounds the inner volume of the manifold.

11. The work machine of claim 8, wherein the fluid tank defines a plurality of walls surrounding the internal volume of the fluid tank, and the fluid tank includes one or more apertures defined on at least one wall of the plurality of walls, the one or more apertures being configured to receive at least one of the manifold or the mount for fixedly mounting the at least one of the manifold or the mount to the fluid tank.

12. The work machine of claim 11, wherein the plurality of walls includes a first wall and a second wall extending at an angle from the first wall, the one or more apertures including:

a first aperture defined at the first wall and configured to receive the manifold; and a second aperture defined at the second wall and configured to receive the mount, wherein the first aperture and the second aperture are connected to each other to define the receptacle portion on the fluid tank.

13. The work machine of claim 8, wherein the manifold is mounted to the fluid tank at a position above a maximum fill level of the fluid in the internal volume of the fluid tank.

14. The work machine of claim 8, wherein the manifold is fixedly mounted to the fluid tank using a welded connection.

15. A method of assembling a system for returning fluid from one or more hydraulic devices to a fluid tank of a work machine, the method comprising:

fixedly mounting a manifold in a receptacle portion of the fluid tank, the manifold defining an inner volume for receiving a flow of the fluid returning from the one or more hydraulic devices; and fixedly mounting a mount to the fluid tank and the manifold, the mount defining one or more passageways configured to establish a fluid connection between the inner volume of the manifold, a fluid filter of the work machine, and an internal volume of the fluid tank.

16. The method of claim 15, wherein the mount defines a first end surface and a second end surface defined opposite to the first end surface and configured to attach the fluid filter to the mount, the one or more passageways including:

a first passageway extending from the first end surface to the second end surface and configured to route the fluid from the inner volume of the manifold to a fluid inlet of the fluid filter; and a second passageway extending from the first end surface to the second end surface and configured to route the fluid from a fluid outlet of the fluid filter to the internal volume of the fluid tank.

17. The method of claim 15, wherein the fluid tank defines a plurality of walls surrounding the internal volume of the fluid tank, and the fluid tank includes one or more apertures defined on at least one wall of the plurality of walls, the one or more apertures being configured to receive at least one of the manifold or the mount for fixedly mounting the at least one of the manifold or the mount to the fluid tank.

18. The method of claim 17, wherein the plurality of walls includes a first wall and a second wall extending at an angle from the first wall, the one or more apertures including:

a first aperture defined at the first wall and configured to receive the manifold; and a second aperture defined at the second wall and configured to receive the mount, wherein the first aperture and the second aperture are connected to each other to define the receptacle portion on the fluid tank.

19. The method of claim 18, wherein fixedly mounting the manifold to the fluid tank includes:

positioning the manifold into the first aperture; and connecting the manifold to edges of the receptacle portion using a welded connection.

20. The method of claim 18, wherein fixedly mounting the mount to each of the fluid tank and the manifold includes:

positioning the mount into the second aperture; and connecting the mount to edges of the receptacle portion and a portion of the manifold using a welded connection.

* * * * *